(12) United States Patent
Tesanovic et al.

(10) Patent No.: US 8,942,305 B2
(45) Date of Patent: Jan. 27, 2015

(54) METHOD FOR COMMUNICATING IN A NETWORK

(75) Inventors: Milos Tesanovic, Cambridge (GB); Timothy James Moulsley, Caterham (GB); Matthew Peter John Baker, Canterbury (GB)

(73) Assignees: Koninklijke Philips N.V., Eindhoven (NL); Sharp Kabushiki Kaisha, Osaka (JP)

( * ) Notice: Subject to any disclaimer, the term of this patent is extended or adjusted under 35 U.S.C. 154(b) by 156 days.

(21) Appl. No.: 13/318,150

(22) PCT Filed: Apr. 22, 2010

(86) PCT No.: PCT/IB2010/051771
§ 371 (c)(1),
(2), (4) Date: Oct. 31, 2011

(87) PCT Pub. No.: WO2010/125503
PCT Pub. Date: Nov. 4, 2010

(65) Prior Publication Data
US 2012/0057645 A1 Mar. 8, 2012

(30) Foreign Application Priority Data
Apr. 30, 2009 (EP) .................................... 09305386

(51) Int. Cl.
*H04B 7/02* (2006.01)
*H04L 1/02* (2006.01)
*H04B 7/06* (2006.01)
*H04B 7/08* (2006.01)
*H04B 7/04* (2006.01)

(52) U.S. Cl.
CPC ............ *H04B 7/0417* (2013.01); *H04B 7/0617* (2013.01); *H04B 7/0848* (2013.01); *H04B 7/0689* (2013.01); *H04B 7/0434* (2013.01); *H04B 7/0626* (2013.01); *H04B 7/0634* (2013.01); *H04B 7/0452* (2013.01)
USPC ........................... 375/267; 375/259; 375/260

(58) Field of Classification Search
USPC ......................................................... 375/267
See application file for complete search history.

(56) References Cited

U.S. PATENT DOCUMENTS

| 2003/0072396 A1* | 4/2003 | Binshtok et al. .............. 375/346 |
| 2004/0028121 A1* | 2/2004 | Fitton ........................... 375/144 |
| 2006/0120478 A1  | 6/2006 | Kim et al. |

(Continued)

FOREIGN PATENT DOCUMENTS

| EP | 1821473 A2 | 8/2007 |
| JP | 2008092433 A | 4/2008 |
| WO | 2009046318 A2 | 4/2009 |

*Primary Examiner* — Erin File

(57) ABSTRACT

The present invention relates to a method for operating a communication system in a network, the system comprising a primary station and at least one secondary station, the primary station comprising a plurality of transmit antennas and the secondary station comprising a plurality of receive antennas, the method comprising the steps of the primary station selecting a first communication scheme among a plurality of communication schemes, the primary station computing a transmission vector on the basis of the first communication scheme, the secondary station computing a reception vector on the basis of a second communication scheme, the second communication scheme being selected among the plurality of communication schemes by the secondary station on the assumption that a predetermined communication scheme is being used by the primary station.

57 Claims, 6 Drawing Sheets

(56) References Cited

U.S. PATENT DOCUMENTS

| | | |
|---|---|---|
| 2007/0036243 A1* | 2/2007 | D'Amico et al. ............ 375/340 |
| 2007/0281746 A1 | 12/2007 | Takano et al. |
| 2008/0090572 A1* | 4/2008 | Cha et al. ..................... 455/436 |
| 2008/0096569 A1* | 4/2008 | Khandekar et al. .......... 455/442 |
| 2008/0144733 A1* | 6/2008 | ElGamal et al. .............. 375/267 |
| 2009/0116449 A1* | 5/2009 | Kishiyama et al. ........... 370/331 |
| 2010/0315970 A1* | 12/2010 | Ramamurthi et al. ........ 370/252 |
| 2011/0045859 A1* | 2/2011 | Moulsley et al. ............. 455/507 |
| 2011/0064154 A1* | 3/2011 | Mudulodu et al. ........... 375/260 |
| 2011/0085587 A1* | 4/2011 | Moulsley et al. ............. 375/219 |

* cited by examiner

METHOD FOR COMMUNICATING IN A NETWORK

FIELD OF THE INVENTION

The present invention relates to a method for communicating in a communication network. More specifically, it relates to a method for communicating between a primary station and one or more secondary stations, in a MIMO (Multiple Input Multiple Output) mode. It also relates to primary stations or secondary stations able to implement such a method.

This invention is, for example, relevant for all wireless communication networks, and in an example of the following description, for a mobile telecommunication network such as UMTS, or UMTS LTE.

BACKGROUND OF THE INVENTION

In communication networks, in order to increase the reachable throughput of communication, MIMO (Multiple Input, Multiple Output) has been proposed widely. MIMO involves the use of multiple antennas at both the transmitter and receiver to improve communication performance. It indeed offers significant increases in data throughput without additional bandwidth or transmit power by higher spectral efficiency (more bits per second per hertz of bandwidth) and link reliability.

Multi User MIMO (MU-MIMO) is an advanced MIMO, allowing a station to communicate with multiple users in the same band simultaneously. In an exemplary embodiment of the invention, a mobile communication network comprises a primary station (base station, or NodeB or eNodeB) which can communicate simultaneously with a plurality of secondary stations (mobile stations, or User Equipment, or UE) with MIMO streams, by using a plurality of primary station antennas and a plurality of secondary station antennas. In order to form the stream, the secondary stations provide the primary station with information related to the state of the channel by transmitting CSI (channel state information) feedback to the primary station. Such CSI indicates an optimal or at least a preferred precoding vector to be used in order to maximise the reachable data rate of the corresponding spatially separable data stream transmitted by the primary station. This precoding vector can be a set of complex values to be applied to each antenna port of the primary station during transmission to direct the data stream towards the secondary station antennas.

However, in the context of MU-MIMO, the signalled precoding vector when used may result in a beam which interferes with another secondary station communicating at the same time with the primary station. Moreover, the secondary station is not able to evaluate where interfering stations are located and whether the use of a precoding vector can cause interference.

Moreover, with particular modes of transmissions, like a MIMO mode based on Singular Value Decomposition (SVD), the post processing carried out by the secondary station and the pre processing carried out by the primary station need to be matched, for example to achieve the diagonalisation of the transmission matrix. However, the flexibility of the whole system is affected if the transmission mode, or details of the transmission mode, need to be reinitialised at every event, like the displacement of a secondary station, or the arrival of an interference source in the network. Such a reinitialization would require a huge amount of signalling to reconfigure the transmission system.

SUMMARY OF THE INVENTION

It is an object of the invention to propose a method which alleviates the above mentioned problem.

It is another object of the invention to propose a method for communicating between a primary station enabling the flexible use of a multi mode MIMO transmission system.

It is another object of one of the embodiments of the invention to propose a method of communicating in a network enabling a Multi User MIMO while reducing the amount of signalling required.

In accordance with a first aspect of the invention, a method is proposed a communication system in a network, the system comprising a primary station and at least one secondary station, the primary station comprising a plurality of transmit antennas and the secondary station comprising a plurality of receive antennas, the method comprising the steps of the primary station selecting a first communication scheme among a plurality of communication schemes, the primary station computing a transmission vector on the basis of the first communication scheme, the secondary station computing a reception vector on the basis of a second communication scheme, the second communication scheme being selected among the plurality of communication schemes by the secondary station on the assumption that a predetermined communication scheme is being used by the primary station.

In accordance with a second aspect of the invention, a method is proposed for operating a secondary station in a network comprising a primary station communicating with a plurality of secondary stations, wherein the method comprises a secondary station computing a reception vector according to a predetermined communication scheme, estimating the combined channel based on the product of the actual channel and the reception vector.

In accordance with a third aspect of the invention, a secondary station is proposed, the secondary station comprising communication means for communicating in a network with a primary station, wherein the secondary station comprises control means for computing a reception vector according to a predetermined communication scheme, and for estimating the combined channel based on the product of the actual channel and the reception vector.

In accordance with a fourth aspect of the invention, it is proposed a primary station comprising means for communicating in a network with at least one secondary station, the primary station comprising a plurality of transmit antennas and the secondary station comprising a plurality of receive antennas, the primary station further comprising control means for selecting a first communication scheme among a plurality of communication schemes, and for computing a transmission vector on the basis of the first communication scheme, the first communication scheme being different from a predetermined communication scheme being used by the secondary station.

As a consequence, this invention defines a set of mechanisms for multiple-input-multiple-output (MIMO) communication between a central entity (primary station or a eNodeB in an LTE implementation) and at least one secondary station (mobile station or a User Equipment in an LTE implementation). The mechanisms described in this invention allow additional flexibility in user and/or stream selection by enhancing the precoding performed by the central entity. According to the invention, this is done by ensuring that the post-processing performed by the secondary station is known to the central entity. This has the advantage of not limiting the precoding to the mode the secondary station is configured in. Indeed, in an embodiment, the primary station is able to change from a first transmission mode to a second transmission although the secondary station may even not be aware of this change, and is still computing the receive weights or post processing in accordance with this first transmission mode. This enables more flexibility at the primary station.

These and other aspects of the invention will be apparent from and will be elucidated with reference to the embodiments described hereinafter.

BRIEF DESCRIPTION OF THE DRAWINGS

The present invention will now be described in more detail, by way of example, with reference to the accompanying drawing, wherein.

DETAILED DESCRIPTION OF THE INVENTION

Figure 1:
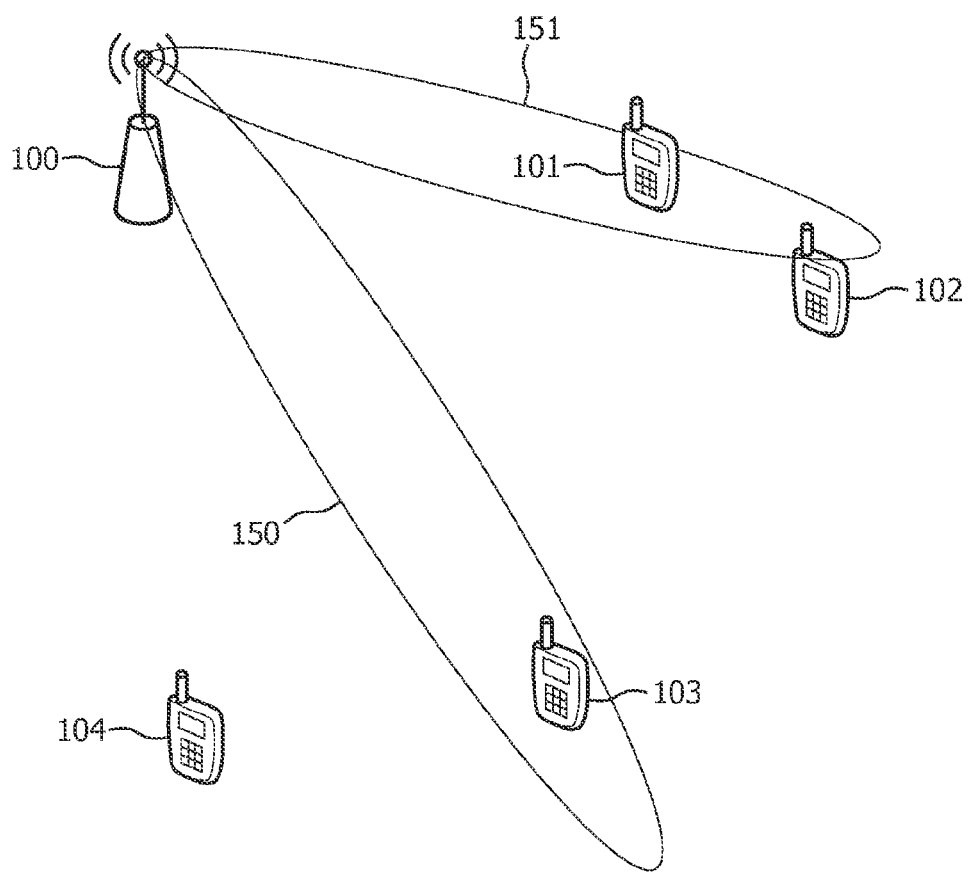
FIG. 1 is a block diagram of a network in which is implemented a first embodiment of the invention.

The present invention relates to a communication network having a primary station and a plurality of secondary stations communicating with the primary station. Such a network is illustrated for example in FIGS. 1 and 2, where a primary station or base station 100 communicates wirelessly with a plurality of secondary stations 101, 102, 103 and 104. In an illustrative example of the invention, the secondary stations 101-104 are mobile stations or user equipment of a UMTS network.

In accordance with a first embodiment of the invention, the primary station 100 comprises an antenna array comprising a plurality of antennas, and a complex gain amplifier so that the primary station 100 is able to carry out beamforming, like MIMO beamforming. Typically, the primary station comprises four antennas. In the most advanced versions of LTE, the primary stations may comprise 8, 16 antennas or more. Similarly, the secondary stations 101-104 comprise a plurality of antennas, e.g. 2 antennas for the UEs compliant with the first LTE release. In later releases the secondary stations may have 4 or 8 antennas, or even more. Thanks to the antenna arrays, the primary station 100 can form beams of data streams, like the beams 150 and 151 depicted on FIG. 1. In order to form the beam and establish a MIMO communication, the generation of precoding vectors is essential, this generation requiring information about the state of the channel and computation on both the secondary station and the primary station sides.

In MIMO systems that support transmission of multiple independent streams, such as singular value decomposition (SVD) MIMO systems, the data for a secondary station is precoded by the right singular vectors of the channel matrix, and then post-processed at the secondary station using the left singular vectors. In this way pre- and post-processing are matched so that the equivalent channel is diagonalised to support transmission of multiple streams without inter-stream interference.

In linear algebra, the singular value decomposition (SVD) is an important factorization of a rectangular real or complex matrix. Applications which employ the SVD include for instance computing the pseudoinverse, least squares fitting of data, matrix approximation, and determining the rank, range and null space of a matrix.

Suppose M is an m-by-n matrix whose entries come from the field K, which is either the field of real numbers or the field of complex numbers. Then there exists a factorization of the form $$M = U\Sigma V^*$$

where U is an m-by-m unitary matrix over K, the matrix $\Sigma$ is m-by-n diagonal matrix with nonnegative real numbers on the diagonal, and V* denotes the conjugate transpose of V, an n-by-n unitary matrix over K. Such a factorization is called a singular-value decomposition of M.

A common convention is to order the diagonal entries $\Sigma_{i,i}$ in non-increasing fashion. In this case, the diagonal matrix $\Sigma$ is uniquely determined by M (though the matrices U and V are not). The diagonal entries of $\Sigma$ are known as the singular values of M.

In M=U$\Sigma$V*, the columns of V form a set of orthonormal "input" or "analysing" basis vector directions for M, the columns of U form a set of orthonormal "output" basis vector directions for M, the matrix $\Sigma$ contains the singular values, which can be thought of as scalar "gain controls" by which each corresponding input is multiplied to give a corresponding output.

Moreover, it is to be noted that a non-negative real number $\sigma$ is a singular value for M if and only if there exist unit-length vectors u in $K^m$ and v in $K^n$ such that $$Mv = \sigma u$$

and $$M^* u = \sigma v.$$

The vectors u and v are called respectively left-singular and right-singular vectors for $\sigma$.

In any singular value decomposition M=U$\Sigma$V* the diagonal entries of $\Sigma$ are necessarily equal to the singular values of M. The columns of U and V are, respectively, left- and right-singular vectors for the corresponding singular values. Consequently, the above theorem states that An m×n matrix M has at least one and at most p=min(m,n) distinct singular values.

However, the transmitter, here the primary station 100, if it is aware of the channel, M, also needs to be aware of the weights that the receiver e.g. secondary station 101 will use, in order to be able to calculate the appropriate precoder. This is even more important if the restriction that both primary and secondary stations operate in the same MIMO mode is lifted.

In a typical SVD system, the primary station would calculate the matrix V of right singular vectors based on the channel matrix feedback received from the secondary station. This restricts the primary station in what transmission mode it can use. If the primary station decided, for example, to use zero-forcing (ZF) instead and/or to schedule multiple users in a MU-MIMO mode, it would have to reconfigure the system, causing signaling of transmission parameters at least from the primary station, and in some cases from both sides. The knowledge of the post-processing matrix U to be used by the secondary stations 101-104 enables the primary station to modify the precoding into a new matrix Vnew.

As a consequence, in accordance with this first embodiment of the invention, it is assumed for the purpose of setting up the communication link that the technique that would be used to transmit multiple streams to a secondary station from the primary station 100 is singular value decomposition (SVD). A secondary station 101 equipped with N receive antennas would then calculate the left singular vectors of the channel matrix estimate and use them for linear processing of the N received signals, expecting to reconstruct N independent data streams. The secondary station may inform the primary station by signaling the result of such estimate.

In a first variant of this embodiment, the primary station communicates with only one secondary station through MIMO communication. In this example, the primary station 100 may reduce the effective rank of transmission during the transmission. What is meant by rank of transmission is the number of spatially separable data streams of the MIMO communication between the primary station and a given secondary station. It is to be noted that the rank cannot exceed the minimum of the number of antennas of the primary station and of the secondary station. For instance, a secondary station having four antennas cannot receive more than four spatially separable streams, so cannot exceed rank-4 communications. Moreover, a sixteen-antenna primary station cannot transmit more than 16 beams without interference between them. As an example, such a primary station could transmit simultaneously four rank-4 MIMO transmissions to four secondary stations, or one rank-4 MIMO transmission to one secondary station with two rank-2 MIMO transmissions to another two secondary stations and eight rank-1 MIMO transmissions to another eight secondary stations.

Once a secondary station performs its post-processing, it expects estimates of the N independent transmitted streams, corresponding to the full rank case. The primary station may decide some singular values are of no use, or to simply use some of its M transmit antennas for transmissions to other users, and therefore it needs to indicate to the secondary station which and how many of the reconstructed N streams are valid, and modify its precoding accordingly.

In this example, the estimates may be computed on the basis of the post processing or post coding coefficients and the actual channel gain, i.e. the channel transmission conditions during the transmission. In a particular example of this invention, these estimates are based on the product of the post processing coefficients with the actual channel conditions. These estimates may be transmitted to the primary station in channel state information (CSI) reports, which may also include a channel quality indicator (CQI).

A channel state information (CSI) report comprises information describing characteristics of the radio channel, typically indicating the complex transfer function matrix between one or more transmit antennas and one or more receive antennas.

A CQI comprises information signalled by a secondary station to the primary station to indicate a suitable data rate (typically a Modulation and Coding Scheme (MCS) value) for downlink transmissions, usually based on a measurement of the received downlink Signal to Interference plus Noise Ratio (SINR) and knowledge of the secondary station's receiver characteristics.

In a variant of this example, the post-processing coefficients are obtained in the secondary station from estimation of the reference symbols for each of the spatial streams. This permits to reduce the signaling amount required from the primary station. However, in a variant of this example, the post-processing coefficients to be used by the secondary station are explicitly signalled by the primary station. In fact, the primary station takes care of estimating these coefficients. This enables to reduce the complexity of the secondary stations, since all the computation needs to be made by the primary station. In such an example, the secondary stations may feedback the quality of reception achieved with a particular set of coefficients. It is to be noted that the V-vector can be feedback to the primary station in a CSI to enable the primary station to adjust the transmission mode or even change the selected transmission scheme.

In another variant of this embodiment, the primary station may decide to schedule multiple users using Zero forming (ZF) beamforming, as opposed to one user using singular value decomposition mode (SVD).

Because the primary station knows, or assumes, that all simultaneously scheduled users will use SVD-based post-processing, it is able to calculate precoding so that the equivalent channel vectors from each of the virtual transmit to receive antenna are mutually orthogonal, enabling itself to schedule multiple users.

Figure 2:
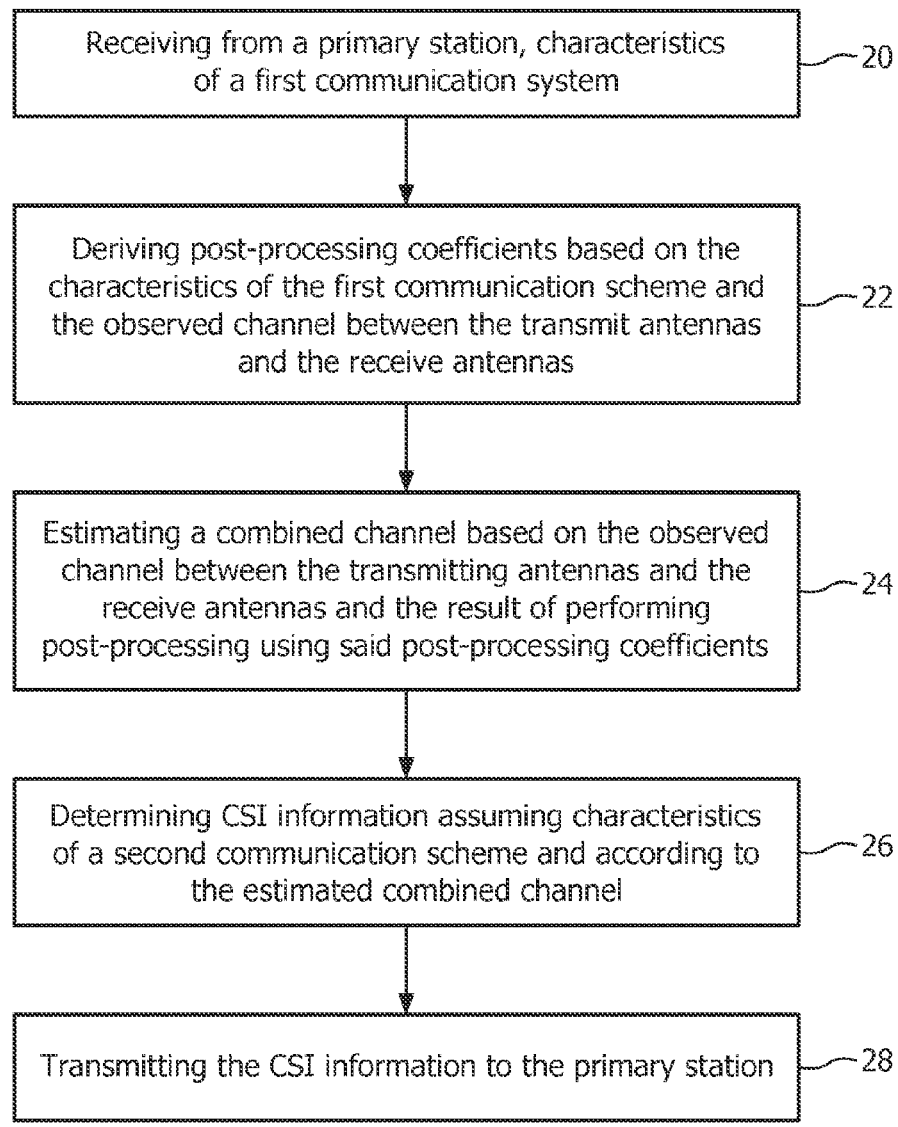
FIG. 2 is a flow diagram of a method which is implemented in accordance with a first embodiment of the invention.
Figure 3:
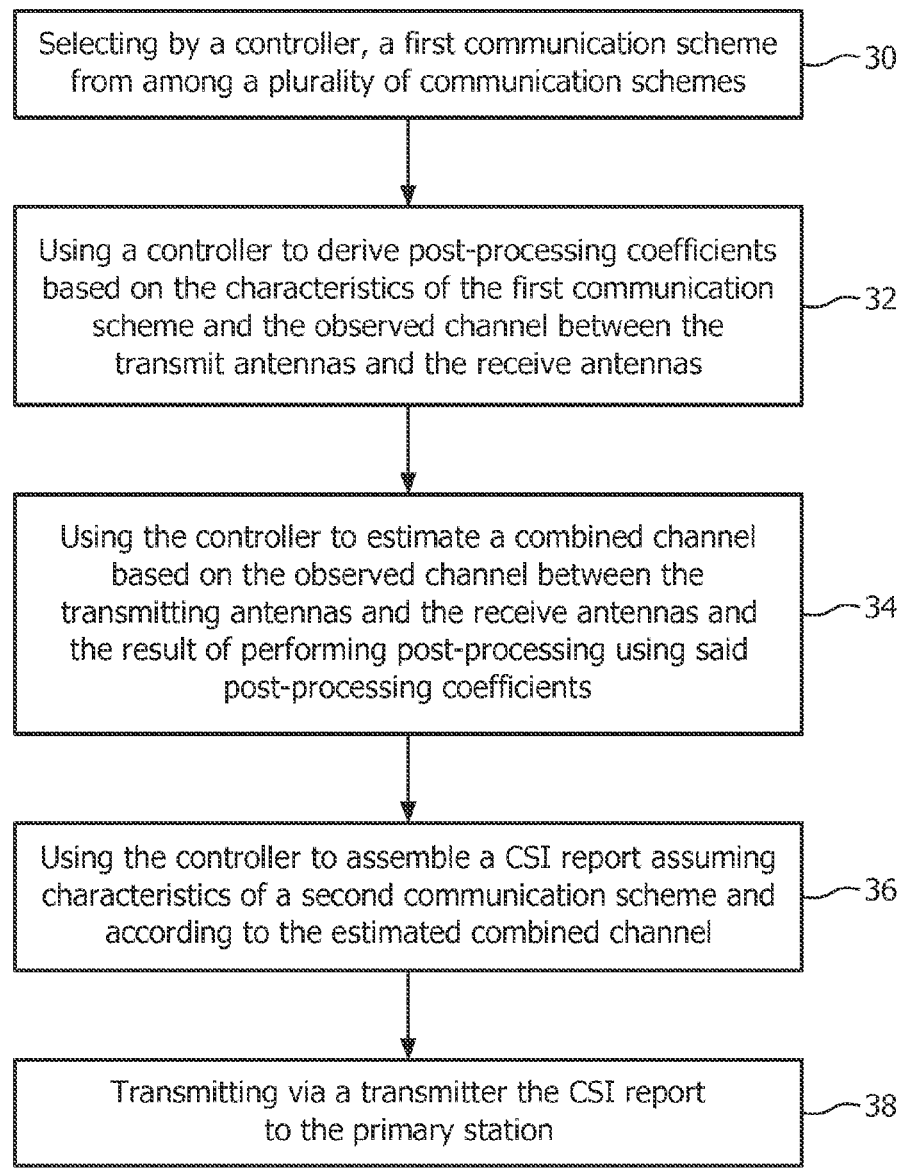
FIG. 3 is a flow diagram of a method which is implemented in accordance with a first embodiment of the invention.
Figure 4:
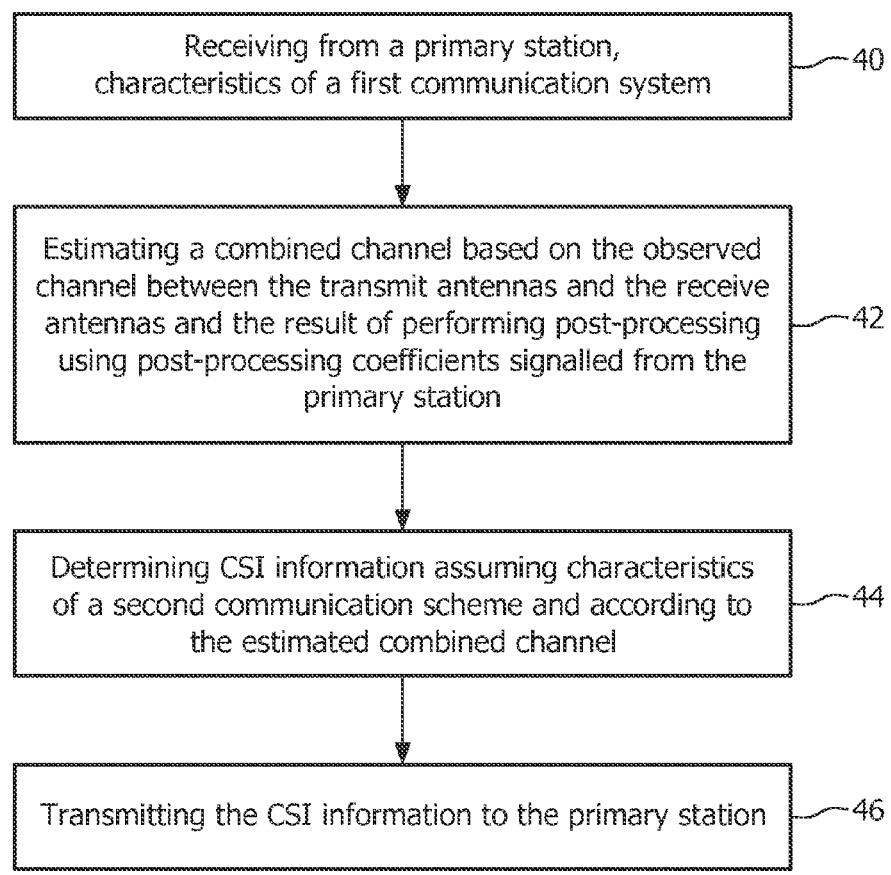
FIG. 4 is a flow diagram of a method which is implemented in accordance with a second embodiment of the invention.
Figure 5:
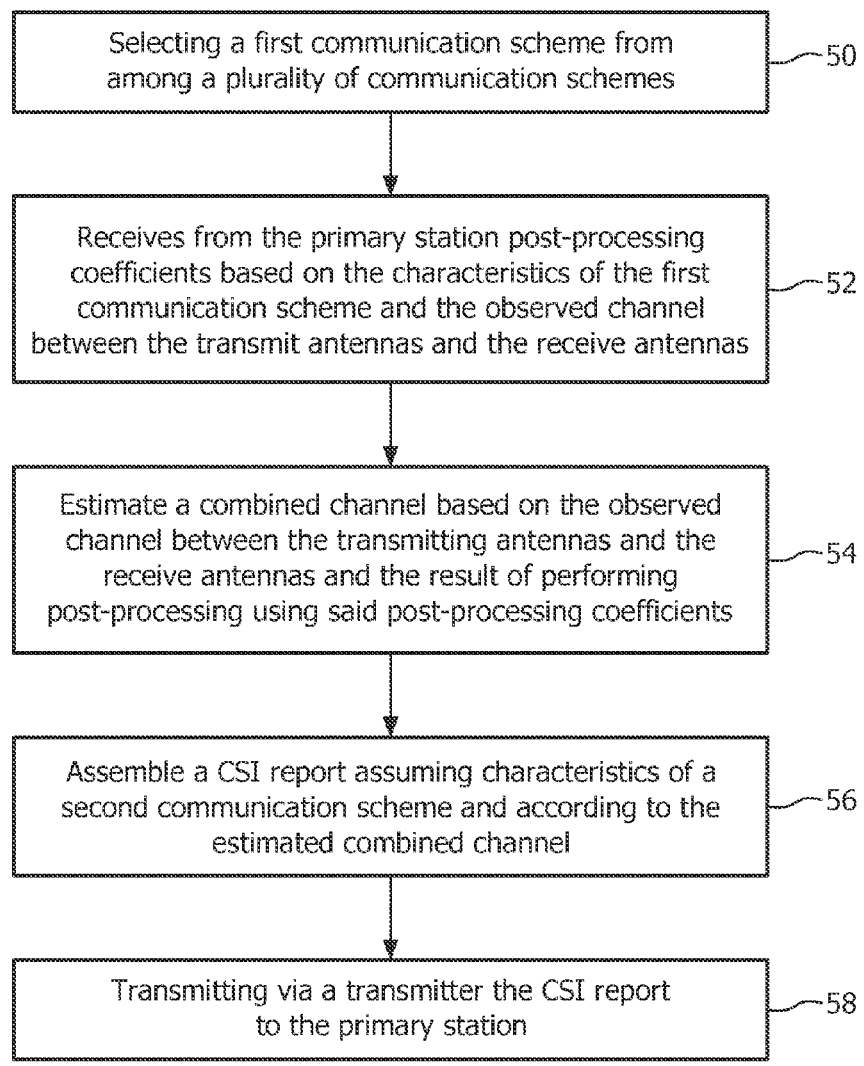
FIG. 5 is a flow diagram of a method which is implemented in accordance with a second embodiment of the invention.
Figure 6:
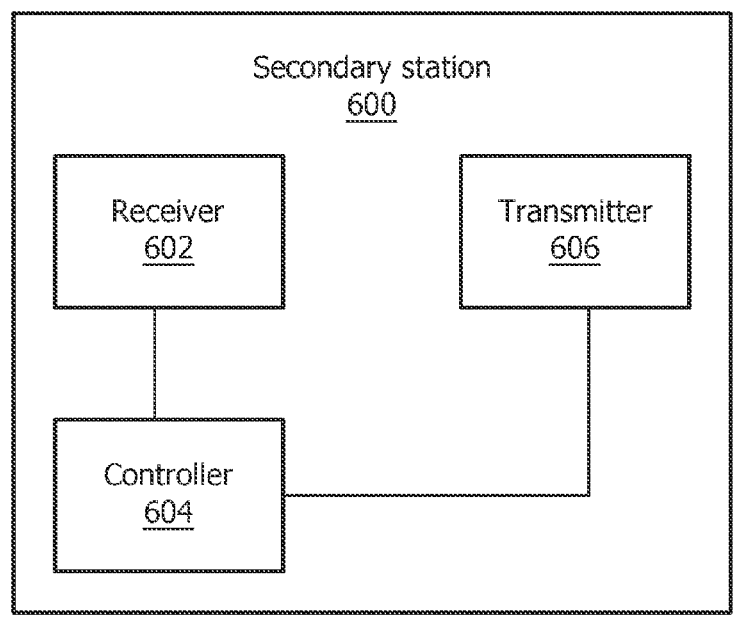
FIG. 6 is a block diagram of a secondary station which is implemented in accordance with a first embodiment of the invention.

FIG. 2 is a flowchart illustrating a method for operating a secondary station in a network comprising a primary station and at Neast one secondary station, the primary station comprising a plurality of transmit antennas and the secondary station comprising a plurality of receive antennas in accordance with an embodiment of the present invention. The method may be practices in connection with, for example, the secondary station 600 of FIG. 6. With re[erence to FIG. 2, a secondary station.

In another embodiment of the invention, it is proposed to operate a communication system as described on FIG. 1, i.e. comprising a primary station 100 equipped with multiple transmit antennas and a plurality of secondary station 101-104 equipped with multiple receive antennas, where the primary station carries out a precoding of data and the secondary stations carry out post-processing, so that one or more independent data streams 150 or 151 can be received by the secondary stations. In this embodiment, the post-processing parameters are calculated in the secondary device from the channel matrix, or the actual channel conditions on the assumption that a certain transmission scheme is used, for instance SVD, or Zero Forcing.

The precoding at the primary station is not constrained to use the same assumption as the one used by the secondary station for the postprocessing (e.g. the primary station does not actually have to use SVD, or the primary station does not actually have to use a specified codebook, the latter being particularly relevant for the LTE-A case of dedicated RS).

In fact, the assumption used by the secondary station may be selected from a set of available assumptions. Moreover, the particular assumption to use may be signalled to the secondary station by the primary station, or is inferred from the reference signals (or pilot signals) by the secondary station. It is to be noted that this is different from configuring the mode, since this can happen dynamically during operation of the communication link.

In any of the above embodiments, the primary station may signal to the secondary station how many spatial streams to use, i.e. the rank of the transmission. This rank may differ from the default value the secondary station expects for the transmission scheme assumption used.

In accordance with another embodiment, the primary station determines what precoding to use, based on the channel feedback from the secondary device, knowledge of the post-processing to be used by the secondary entity, and certain service targets, and carries out scheduling accordingly.

In a particular embodiment, the primary station is a mobile station or a User Equipment, and the secondary station is a Base station or an eNodeB.

The invention has particular, but not exclusive, application to wireless communication systems that employ MIMO and MU-MIMO. Examples include cellular systems such as UMTS, UMTS LTE, and UMTS LTE-Advanced, as well as wireless LANs (IEEE 802.11n) and broadband wireless (IEEE 802.16).

The invention may be applicable to mobile telecommunication systems like UMTS LTE and UMTS LTE-Advanced, but also to wireless communication systems that employ MIMO and MU-MIMO. Examples include cellular systems along with UMTS, UMTS LTE, and UMTS LTE-Advanced, such as wireless LANs (IEEE 802.11n) and broadband wireless (IEEE 802.16).

In the present specification and claims the word "a" or "an" preceding an element does not exclude the presence of a plurality of such elements. Further, the word "comprising" does not exclude the presence of other elements or steps than those listed.

The inclusion of reference signs in parentheses in the claims is intended to aid understanding and is not intended to be limiting.

From reading the present disclosure, other modifications will be apparent to persons skilled in the art. Such modifications may involve other features which are already known in the art of radio communication.

The invention claimed is:

1. A method for operating a secondary station in a network comprising a primary station and at least one secondary station, the primary station comprising a plurality of transmit antennas and the secondary station comprising a plurality of receive antennas, the method comprising:
   receiving from the primary station, characteristics of a first communication scheme,
   deriving post-processing coefficients based on the characteristics of the first communication scheme and the observed channel between the transmit antennas and the receive antennas, and
   estimating a combined channel based on the observed channel between the transmit antennas and the receive antennas and the result of performing post-processing using said post-processing coefficients,
   determining CSI information assuming characteristics of a second communication scheme and according to the estimated combined channel, and
   transmitting said CSI information to the primary station.

2. The method of claim 1, where the first communication scheme is predetermined.

3. The method of claim 1, wherein characteristics of the first communication scheme are received by the secondary station from the primary station before performing the post processing.

4. The method of claim 1, where the first communication scheme is based on any of the following: SVD (single value decomposition), zero-forcing, and codebook-based pre-coding.

5. The method of claim 1, where the controller assembles a CSI (channel state indicator) report that is based on the estimate of the combined channel, and transmits using a transmitter, the CSI report to the primary station.

6. The method of claim 5, wherein the CSI includes an indication representative of a complex transfer function matrix between at least one of the plurality of the transmit antennas and at least one of the plurality of receive antennas.

7. The method of claim 5, wherein the CSI includes an indication representative of a right singular vector computed from the SVD (singular value decomposition) of the channel transfer function.

8. The method of claim 5, where the receiver is configured to receive from the primary station, data using pre-coding derived from the reported CSI.

9. The method of claim 1, wherein the reception occurs on a plurality of spatial streams, the number of spatial streams being predetermined under the assumption of one of either the first or the second communication schemes.

10. The method of claim 1, wherein the reception occurs on a plurality of spatial streams, wherein the receiver is configured to receive from the primary station, a number of spatial streams to be used.

11. The method of claim 1, wherein the post processing comprises computing a reception vector and the combined channel is estimated based on the product for the actual channel and the reception vector.

12. A secondary station comprising:
   a receiver configured to receive, from the primary station, coefficients used in post processing,
   a controller configured to select a first communication scheme from a plurality of communication schemes,
   the controller being configured to derive post-processing coefficients based on the characteristics of the first communication scheme and the observed channel between the transmit antennas and the receive antennas,
   the controller being configured to estimate a combined channel based on an observed channel between the plurality of transmit antennas and the plurality of receive antennas, and the results of the post-processing using said post processing coefficients
   the controller being configured to assemble a CSI (Channel State Information) report assuming characteristics of a second communication scheme and according to the estimated combined channel and,
   a transmitter configured to transmit the CSI report to the primary station.

13. The secondary station of claim 12, where the results of post-processing are post-processed characteristics and the estimate is the product of the actual channel and coefficients determined by post-processing.

14. The secondary station of claim 12, where the first communication scheme is predetermined.

15. The secondary station of claim 12, wherein characteristics of the first communication scheme are received by the secondary station from the primary station before the post-processing.

16. The secondary station of claim 12, where the first communication scheme is based on any of the following: SVD (single value decomposition), zero-forcing, and codebook-based pre-coding.

17. The secondary station of claim 12, where the transmitter is configured to transmit an estimate of the combined channel in a CSI (channel state indicator) to the primary station.

18. The secondary station of claim 17, where the CSI includes the channel quality indicator (CQI) which is computed based on an assumption of a primary station using a second communication scheme.

19. The secondary station of claim 17, wherein the CSI includes an indication representative of a complex transfer function matrix between at least one of the plurality of the transmit antennas and at least one of the plurality of receive antennas.

20. The secondary station of claim 17, where the receiver receives from the primary station, data using pre-coding and derived from the reported CSI.

21. The secondary station of claim 12, wherein the transmission and reception each occur on a plurality of spatial streams, the number of spatial streams being predetermined under the assumption of one of either the first or the second communication schemes.

22. The secondary station of claim 12, wherein the transmitter is configured to transmit on a plurality of spatial streams and the receiver is configured to receive on a plurality of spatial streams, and wherein the receiver is configured to receive from the primary station a number, the number indicating the number of spatial streams to be used by the transmitter and by the receiver of the secondary station.

23. The secondary station of claim 12, wherein the post processing comprises computing a reception vector and the combined channel is estimated based on the product for the actual channel and the reception vector.

24. A method for operating a secondary station in a network comprising a primary station and at least one secondary station, the primary station comprising a plurality of transmit antennas and the secondary station comprising a plurality of receive antennas, the method comprising:
  selecting by a controller of the secondary station, a first communication scheme from among a plurality of communication schemes,
  using a controller to derive post-processing coefficients based on the characteristics of the first communication scheme and the observed channel between the transmit antennas and the receive antennas,
  using the controller to estimate a combined channel based on an observed channel between the plurality of transmit antennas and the plurality of receive antennas, and the results of the post-processing using said post processing coefficients
  using the controller to assemble a CSI (Channel State Information) report assuming characteristics of a second communication scheme and according to the estimated combined channel and
  transmitting via a transmitter of the secondary station, the CSI report to the primary station.

25. The method of claim 24, where the results of the post-processing are coefficients determined by the post-processing.

26. The method of claim 25, where the first communication scheme is predetermined.

27. The method of claim 25, wherein characteristics of the first communication scheme are received by the secondary station from the primary station before performing the post processing.

28. The method of claim 25, where the first communication scheme is based on any of the following: SVD (single value decomposition), zero-forcing, and codebook-based pre-coding.

29. The method of claim 25, where the controller assembles a CSI (channel state indicator) report that is based on the estimate of the combined channel, and transmits using a transmitter, the CSI report to the primary station.

30. The method of claim 29, where the CSI includes the channel quality indicator (CQI) which is computed based on an assumption that the primary station is using a second communication scheme.

31. The method of claim 29, wherein the CSI includes an indication representative of a complex transfer function matrix between at least one of the plurality of the transmit antennas and at least one of the plurality of receive antennas.

32. The method of claim 25, where the receiver is configured to receive from the primary station, data using pre-coding derived from the reported CSI.

33. The method of claim 25, wherein the reception occurs on a plurality of spatial streams, the number of spatial streams being predetermined under the assumption of one of either the first or the second communication schemes.

34. The method of claim 25, wherein the reception occurs on a plurality of spatial streams, wherein the receiver is configured to receive from the primary station, a number of spatial streams to be used.

35. A method for operating a secondary station in a network comprising a primary station and at least one secondary station, the primary station comprising a plurality of transmit antennas and the secondary station comprising a plurality of receive antennas, the method comprising:
  receiving from the primary station characteristics of a first communication scheme,
  estimating a combined channel based on the observed channel between the transmit antennas and the receive antennas and the result of performing post-processing using post processing coefficients signalled from the primary station
  determining CSI information assuming said characteristics of the first communication scheme and according to the estimated combined channel and
  transmitting said CSI information to the primary station.

36. The method of claim 35, where the results of the post-processing are coefficients determined by the post-processing.

37. The method of claim 35, where the first communication scheme is predetermined.

38. The method of claim 35, wherein characteristics of the first communication scheme are received by the secondary station from the primary station before performing the post processing.

39. The method of claim 35, where the first communication scheme is based on any of the following: SVD (single value decomposition), zero-forcing, and codebook-based pre-coding.

40. The method of claim 35, where the controller assembles a CSI (channel state indicator) report that is based on the estimate of the combined channel, and transmits using a transmitter, the CSI report to the primary station.

41. The method of claim 40, where the CSI includes the channel quality indicator (CQI) which is computed based on an assumption that the primary station is using a second communication scheme.

42. The method of claim 40, wherein the CSI includes an indication representative of a complex transfer function matrix between at least one of the plurality of the transmit antennas and at least one of the plurality of receive antennas.

43. The method of claim 35, where the receiver is configured to receive from the primary station, data using pre-coding derived from the reported CSI.

44. The method of claim 35, wherein the reception occurs on a plurality of spatial streams, the number of spatial streams being predetermined under the assumption of one of either the first or the second communication schemes.

45. The method of claim 35, wherein the reception occurs on a plurality of spatial streams, wherein the receiver is configured to receive from the primary station, a number of spatial streams to be used.

46. A method for operating a secondary station in a network comprising a primary station and at least one secondary station, the primary station comprising a plurality of transmit antennas and the secondary station comprising a plurality of receive antennas, the method comprising:
  selecting a first communication scheme from among a plurality of communication schemes,
  receiving coefficients to be used in post-processing
  estimating a combined channel based on an observed channel between the plurality of transmit antennas and the plurality of receive antennas, and the results of the post-processing using said post processing coefficients, assembling a CSI (Channel State Information) report assuming characteristics of the first communication scheme and according to the estimated combined channel and transmitting the CSI report to the primary station.

47. The method of claim 46, where the results of the post-processing are coefficients determined by the post-processing.

48. The method of claim 46, where the first communication scheme is predetermined.

49. The method of claim 46, wherein characteristics of the first communication scheme are received by the secondary station from the primary station before performing the post processing.

50. The method of claim 46, where the first communication scheme is based on any of the following: SVD (single value decomposition), zero-forcing, and codebook-based pre-coding.

51. The method of claim 46, where the controller assembles a CSI (channel state indicator) report that is based on the estimate of the combined channel, and transmits using a transmitter, the CSI report to the primary station.

52. The method of claim 51, where the CSI includes the channel quality indicator (CQI) which is computed based on an assumption that the primary station is using a second communication scheme.

53. The method of claim 51, wherein the CSI includes an indication representative of a complex transfer function matrix between at least one of the plurality of the transmit antennas and at least one of the plurality of receive antennas.

54. The method of claim 46, where the receiver is configured to receive from the primary station, data using precoding derived from the reported CSI.

55. The method of claim 46, wherein the reception occurs on a plurality of spatial streams, the number of spatial streams being predetermined under the assumption of one of either the first or the second communication schemes.

56. The method of claim 46, wherein the reception occurs on a plurality of spatial streams, wherein the receiver is configured to receive from the primary station, a number of spatial streams to be used.

57. A secondary station comprising:

a receiver configured to receive, from the primary station, coefficients used in post processing, a controller configured to select a first communication scheme from a plurality of communication schemes, the controller being configured to receive from the primary station, coefficients to be used in post-processing, the controller being configured to estimate a combined channel based on an observed channel between the plurality of transmit antennas and the plurality of receive antennas, and the results of the post-processing using said post processing coefficients, the controller being configured to assemble a CSI (Channel State Information) report assuming characteristics of the first communication scheme and according to the estimated combined channel, and a transmitter configured to transmit the CSI report to the primary station.

* * * * *